(12) United States Patent
Sverdrup et al.

(10) Patent No.: US 8,789,943 B2
(45) Date of Patent: Jul. 29, 2014

(54) METHODS AND LENSES FOR CORRECTION OF CHROMATIC ABERRATION

(75) Inventors: Lawrence H. Sverdrup, Poway, CA (US); Sean Sigarlaki, Chula Vista, CA (US); Jagdish M. Jethmalani, San Diego, CA (US); Andreas W. Dreher, Escondido, CA (US); Jeffrey S. Chomyn, San Diego, CA (US)

(73) Assignee: Essilor International (Compagnie Generale d'Optique), Charenton Cedex (FR)

( * ) Notice: Subject to any disclaimer, the term of this patent is extended or adjusted under 35 U.S.C. 154(b) by 822 days.

(21) Appl. No.: 13/037,138

(22) Filed: Feb. 28, 2011

(65) Prior Publication Data

US 2011/0199572 A1 Aug. 18, 2011

Related U.S. Application Data

(62) Division of application No. 11/861,196, filed on Sep. 25, 2007, now Pat. No. 7,918,555.

(60) Provisional application No. 60/847,175, filed on Sep. 25, 2006, provisional application No. 60/847,019, filed on Sep. 25, 2006.

(51) Int. Cl.
| | |
|---|---|
| *G02C 7/02* | (2006.01) |
| *B29D 11/00* | (2006.01) |
| *G02B 3/04* | (2006.01) |
| *G02B 27/00* | (2006.01) |
| *G02B 13/14* | (2006.01) |

(52) U.S. Cl.
CPC ...... *G02B 27/0025* (2013.01); *B29D 11/00009* (2013.01); *G02C 7/02* (2013.01); *G02B 3/04* (2013.01); *G02B 13/146* (2013.01)
USPC .................................. 351/159.01; 351/159.73

(58) Field of Classification Search
USPC ............. 351/159.01, 159.73, 159.74, 159.75, 351/200, 233, 246; 356/124, 127
See application file for complete search history.

(56) References Cited

U.S. PATENT DOCUMENTS

| | | | |
|---|---|---|---|
| 5,223,862 A | 6/1993 | Dasher et al. | |
| 5,512,371 A | 4/1996 | Gupta et al. | |
| 5,684,636 A | 11/1997 | Chow et al. | |
| 5,859,685 A * | 1/1999 | Gupta et al. | ............. 351/159.01 |
| 6,712,466 B2 | 3/2004 | Dreher | |
| 6,786,603 B2 | 9/2004 | Altmann | |
| 6,989,938 B2 | 1/2006 | Bruns | |
| 2004/0080710 A1 | 4/2004 | Wooley et al. | |
| 2006/0052547 A1 | 3/2006 | Jethmalani et al. | |

FOREIGN PATENT DOCUMENTS

WO    WO-2006/029264    3/2006

OTHER PUBLICATIONS

Flaim et al., SPIE (2003) Advances in Optical Thin Films, paper #20, vol. 5250 (abstract only).
Hampton et al., Journal of the American Optometric Association (1991) 62:760-765.

(Continued)

*Primary Examiner* — James Greece
(74) *Attorney, Agent, or Firm* — Cozen O'Connor

(57) ABSTRACT

The subject invention provides lenses, and methods for designing and manufacturing these lenses, with reduced chromatic aberration. Advantageously, these lenses are specifically designed to correct chromatic aberration that results as multichromatic light passes through the lenses.

24 Claims, 7 Drawing Sheets

(56) References Cited

OTHER PUBLICATIONS

Keirl, Dispensing Optics (Dec. 2000/Jan. 2001) pp. 1-5.
Tang et al., Ophthalmic and Physiological Optics (1992) 12:340-349.
Varady, Ophthalmic and Physiological Optics (2006) 26:246-253.

* cited by examiner

METHODS AND LENSES FOR CORRECTION OF CHROMATIC ABERRATION

RELATED APPLICATIONS

This application is a divisional of U.S. Ser. No. 11/861,196, filed 25 Sep. 2007, which claims priority to U.S. Ser. No. 60/847,175, filed 25 Sep. 2006, and U.S. Ser. No. 60/847,019 filed 25 Sep. 2006. The contents of these applications are hereby incorporated by reference in their entireties.

BACKGROUND OF INVENTION

A lens is a device usually formed from a piece of shaped glass or plastic that causes light to either converge and concentrate, or to diverge. One important use of lenses is as a prosthetic for the correction of visual impairments such as myopia, hyperopia, presbyopia, and astigmatism. Other uses are in imaging systems such as a monocular, binoculars, telescope, spotting scope, telescopic gun sight, theodolite, microscope, and camera (photographic lens).

Lenses do not form perfect images; there is always some degree of distortion or aberration introduced by the lens that causes the image to be an imperfect replica of the object. Thus, aberrations result when the optical system misdirects some of the object's rays. There are several types of aberrations that can affect image quality. Some aberrations occur when electromagnetic radiation of one wavelength is being imaged (monochromatic aberrations), and others occur when electromagnetic radiation of two or more wavelengths is imaged (chromatic aberrations).

Chromatic aberration is caused by a lens having a different refractive index for different wavelengths of light (the dispersion of the lens).

Since the focal length f of a lens is dependent on the refractive index n, different wavelengths of light will be focused at different locations. Chromatic aberration can be both longitudinal, in that different wavelengths are focused at a different distance from the lens; and transverse or lateral, in that different wavelengths are focused at different positions in the focal plane (because the magnification of the lens also varies with wavelength). Longitudinal and lateral chromatic aberration of a lens is seen as "fringes" of color around the image, because each color in the optical spectrum cannot be focused at a single common point. For example, eyeglass wearers, with strong myopic correction, can experience color spreading in the periphery of the eyeglass lenses. Although the brain will mask perception of these colored fringes after a period of adaptation, their deleterious effect on visual acuity remain.

Because the distortion introduced by aberrations into an optical system significantly degrades the quality of the images on the image plane of such system, there are advantages to the reduction of those aberrations. Various techniques are often used to reduce the aberrations. One such technique involves the use of a wavefront aberrator.

Wavefront aberrators are particularly useful in eye glasses or contact lenses for use in correcting human eye sight. U.S. Pat. No. 6,989,938 describes one such wavefront aberrator and methods for manufacturing it. U.S. Pat. No. 6,712,466 describes eyeglass lenses having a variable index of refraction.

BRIEF SUMMARY

The subject invention provides lenses, and methods for designing and manufacturing these lenses, with reduced chromatic aberration. Advantageously, these lenses are specifically designed to correct chromatic aberration that results as multi-chromatic light passes through the lenses.

Specific embodiments of the subject invention pertain to lenses that have a first sub-lens, a second sub-lens, and a material between the first sub-lens and the second sub-lens, where the shape, index of refraction, and Abbe number of the materials of the first sub-lens, second sub-lens, and material between the first sub-lens and the second sub-lens are selected to reduce chromatic aberrations of the lenses.

A further embodiment of the present invention provides methods for educating customers about the advantages of the lenses of the subject invention and/or promoting the sale or use of these lenses. In this embodiment, promotional materials including, but not limited to, pamphlets, newsletters and other written materials describe the deleterious effects of chromatic aberration and explain that the lenses of the subject invention reduce chromatic aberration, especially compared to traditional eyeglass lenses.

BRIEF DESCRIPTION OF DRAWINGS

FIG. 3A shows a base with negative sphere, FIG. 3B shows an polymer layer with positive sphere, FIG. 3C shows a cover with no power, and FIG. 3D shows an embodiment of the invention incorporating the elements of FIGS. 3A-3C.

DETAILED DESCRIPTION

The subject invention provides wavefront aberrators (including lenses for correcting vision) with reduced chromatic aberration. Advantageously, these lenses are specifically designed to correct chromatic aberration of the lens that results as multichromatic light passes through the lenses. The subject invention further provides methods for designing these lenses as well as methods for manufacturing them.

Specific embodiments of the subject invention pertain to composite lenses that have a first sub-lens, a second sub-lens, and a material between the first sub-lens and the second sub-lens, where the shape, index of refraction, and Abbe number of the materials of the first sub-lens, second sub-lens, and material between the first sub-lens and the second sub-lens are selected to increase the overall effective Abbe value and reduce chromatic aberrations of the lenses.

Chromatic aberration can be addressed in lenses by combining two different materials with differing Abbe numbers. One of the materials is made into a positive lens, and the other into a negative lens. The powers are not equal, so that the overall power is non-zero. The lower power lens preferably has the smaller (worse) Abbe number. That way, dispersion in the more powerful of the two lenses can be made to counterbalance the opposite but stronger dispersion in the less powerful lens.

Figure 1:
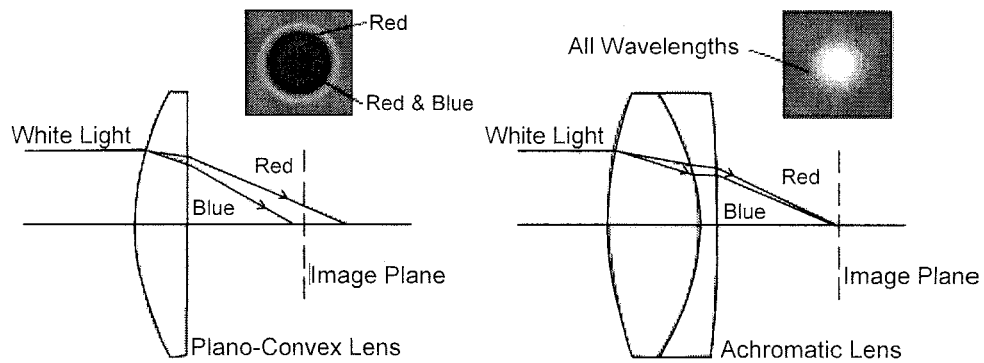
FIG. 1 shows the use of two lenses to reduce chromatic aberration of the resulting lens system.

FIG. 1 illustrates an example of combining two lenses of different materials in this manner.

Mathematically, the power of a lens in diopters P is related to the focal length f in meters by the relation $$P = \frac{1}{f}$$

The Abbe number of an optical material is defined by the indices of refraction $n_\lambda$ at three different wavelengths according to $$V = \frac{n_{587.6\ nm} - 1}{n_{486.1\ nm} - n_{656.3\ nm}}$$

The equations for an achromatic doublet lens are $$P_1 + P_2 = P$$

$$\frac{P_1}{V_1} + \frac{P_2}{V_2} = 0$$

In the above equations the subscript "1" and "2" refer to the two types of materials. P is the net power of the overall lens. With most available materials, the Abbe number V is always positive. Thus, in order to satisfy the second equation above, $P_1$ and $P_2$ must have opposite sign. Also, the lens with the smaller power must also have a smaller Abbe number. The only problem with the equations as given so far, is that the conventional Abbe number is not optimized as a description of the dispersion for ophthalmic use.

Figure 2:
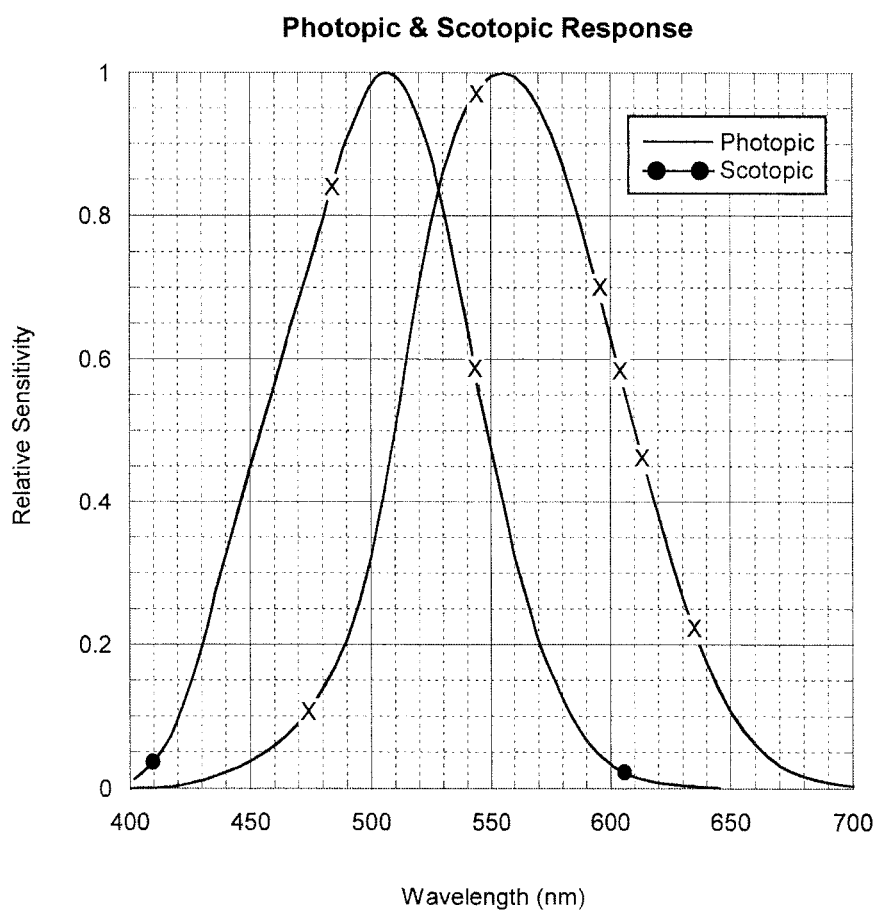
FIG. 2 shows the photopic and scotopic response curves, which represent the sensitivity versus wavelength for the cones and rods, respectively, in the human retina.

Referring to FIG. 2, a graph is shown of the photopic and scotopic curves, which represent the sensitivity versus wavelength for the cones and rods, respectively, in the human retina. The scotopic curve is significantly blue-shifted with respect to the photopic curve. The photopic peak is located at 555 nm while the scotopic peak is at 505 nm. The mesopic curve, representing vision at dusk or nighttime driving when both cones and rods are involved, is a matter of debate and perhaps lies somewhere in between.

For daytime vision, the photopic curve is relevant. The ideal analog of the Abbe number relevant to ophthalmic applications, which will be denoted as the photopic Abbe number ($V_{photopic}$), can be defined as follows:

$$V_{photopic} = \frac{n_{555\ nm} - 1}{n_{510\ nm} - n_{610\ nm}} \cdot \frac{610 - 510}{656.3 - 486.1}$$

The index in the numerator is at the photopic peak, and the indices in the denominator are the 50% points of the photopic curve. The area under the photopic curve between the 50% points represents 80% of the total area. The trailing numerical factor is to scale the result so that the photopic and conventional Abbe values have identical value in the case of constant dispersion (refractive index varies linearly with wavelength).

For night vision, the scotopic curve is relevant. The ideal analog of the Abbe number relevant to ophthalmic applications at night time, which will be denoted as the scotopic Abbe number ($V_{scotopic}$), could be defined as follows:

$$V_{scotopic} = \frac{n_{505\ nm} - 1}{n_{455\ nm} - n_{550\ nm}} \cdot \frac{550 - 455}{656.3 - 486.1}$$

The index in the numerator is at the scotopic peak, and the indices in the denominator are the 50% points of the scotopic curve. The area under the scotopic curve between the 50% points again represents 80% of the total area.

For vision at dusk, and nighttime driving, the mesopic sensitivity curve is relevant. The appropriate mesopic curve is currently an area of active research (see G. Varady, P. Bodrogi, "Mesopic spectral sensitivity functions based on visibility and recognition thresholds," Ophthal. Physiol. Opt., Vol 26 (2006) pp. 246-253). For foveal vision on-axis the photopic curve always applies, regardless of lighting level. What has been done is to take a linear combination of the photopic and scotopic curves and determine the best mix for various lighting levels and tasks. The appropriate formula for the mesopic Abbe number can be guessed at, but is not known for arbitrary tasks and lighting levels. However, obtaining the lowest net dispersion across both the photopic and mesopic range (455 nm-610 nm) may be optimum. In this case the mesopic Abbe number could be defined as:

$$V_{mesopic} = \frac{n_{555\ nm} - 1}{n_{455\ nm} - n_{610\ nm}} \cdot \frac{610 - 455}{656.3 - 486.1}$$

The index in the numerator is at the photopic peak, and the indices in the denominator are the short-wavelength 50%-point of the scotopic curve, and the long-wavelength 50%-point of the photopic curve. Unless the lenses are specifically for very dark conditions, the numerator probably should be the photopic peak. But even when designed strictly for mesopic vision, foveal vision is always photopic, and it is not clear that the numerator should be the index at a bluer wavelength such as 530 nm, which is the arithmetic mean of the scotopic and photopic peaks.

The layer of material between the first sub-lens and the second sub-lens can be referred to as a polymer layer. The polymer material can include the monomer and polymer compositions as disclosed in published U.S. Patent Application 2006/0052547 (Ser. No. 10/936,030), which is hereby incorporated by reference in its entirety. The standard form of color correction is to form an achromatic doublet as previously described and illustrated in FIG. 1. However, the color correction need not be complete to provide visual benefit.

Figure 3A:
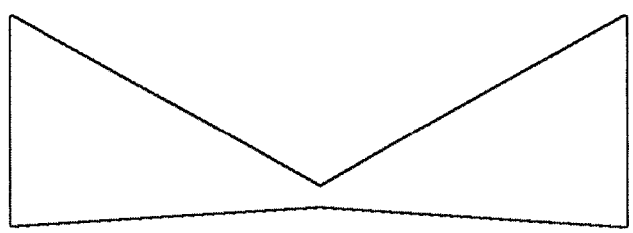
FIGS. 3A-3D show a schematic of an embodiment of the subject invention, where
Figure 3B:
Figure 3C:
Figure 3D:
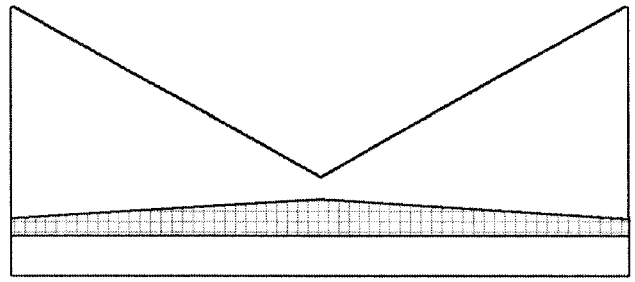

Most patients are myopic and require a negative lens, so that is the version shown in FIG. 3D. FIG. 3D shows an embodiment of the invention incorporating the elements of FIGS. 3A-3C, where FIG. 3A shows a base with negative sphere, FIG. 3B shows a polymer layer with positive sphere, and FIG. 3C shows a cover with no power. For a hyperopic patient, an overall positive lens is required and color correction would require a thinner polymer layer in the center than at the edges, the opposite of what is depicted in FIG. 3B.

Figure 4A:
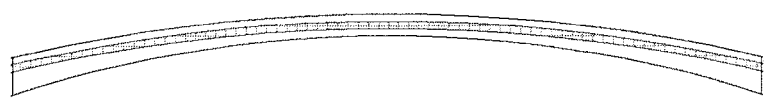
FIGS. 4A-4E show various embodiments of the subject invention incorporating a first sub-lens, a second sub-lens and a material between the first and second sub-lenses.
Figure 4B:
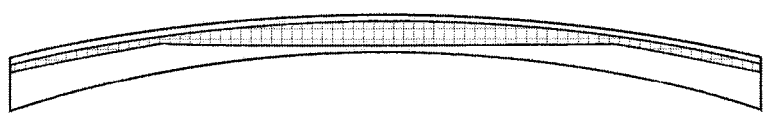
Figure 4C:
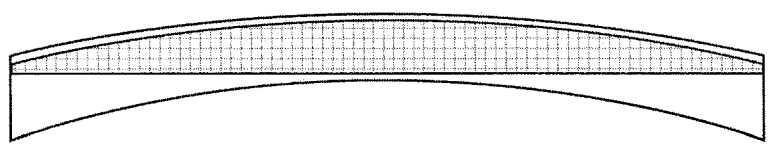
Figure 4D:
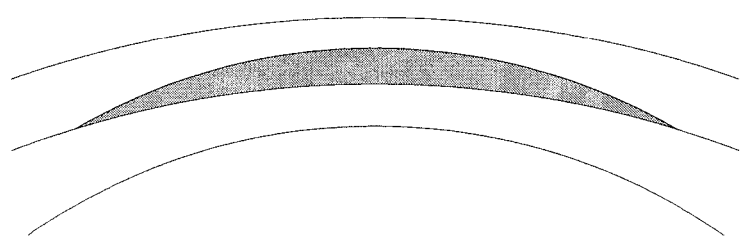
Figure 4E:
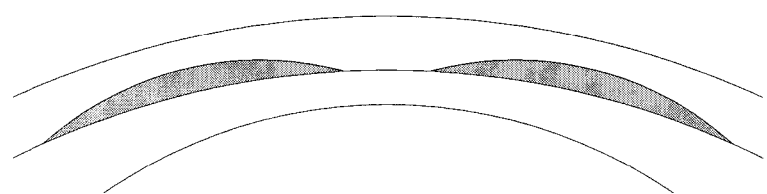

In specific embodiments, the subject composite lenses have a polymer layer that is thicker in the center and thinner at the edges. FIGS. 4A, 4B, and 4C show schematics of specific embodiments of lenses in accordance with the invention. FIGS. 4A, 4B, and 4C show schematics of specific embodiments in accordance with the invention where the polymer compensating element is shown as the shaded area between a first sub-lens and a second sub-lens. FIG. 4D shows a lens configuration where the polymer compensation element is positioned only in the middle area of the lens to provide chromatic aberration in that area of the composite lens. FIG. 4E shows a composite lens configuration where the polymer compensation element has a doughnut shape where it is thicker around the periphery of the composite lens and provides chromatic aberration reduction in that area where it is most desired, namely the periphery of the lens.

In another embodiment of the present invention, polycarbonate is used as the sub-lens material for either or both of the first and second sub-lenses to make a composite lens. A negative polycarbonate lens has a very low Abbe number (~30) and making a negative polycarbonate composite lens with a compensating polymer with an Abbe value of about 36 and a positive power will produce a composite lens with an Abbe value greater than 36. Similarly, a positive polycarbonate lens has a very low Abbe number (~30) and making a positive polycarbonate composite lens with a compensating polymer with an Abbe value of about 36 and a negative power will produce a composite lens with an Abbe value greater than 36. Similar results are obtained with similar sub-lens materials where the goal is to increase the Abbe number of the composite lens.

In a specific embodiment, lenses have a polymer layer that is shaped to combat chromatic aberration in negative lenses as typically dispensed to myopic patients. The polymer thickness variation can then be controlled by modifying the curvatures of the cap and base lenses. Accordingly, by controlling the curvatures of the top of the base and the inside of the caps, the effect can be optimized for every patient, where optimum color correction depends upon the prescription.

According to embodiments, composite lenses mode have a polymer layer that can be thicker in the center and thinner at the edges. The following Table 1 shows data for typical 75 mm Samsung 1.6 lens blanks used for production, in a variety of base curves. As illustrated by Table 1, the center thickness almost always exceeds the edge thickness. The thickness disparity depends upon base curve and is largest for 3-base. The 2-base and 4-base have a significant disparity. The 5-base has a small disparity and 7-base has at best a small disparity.

TABLE 2

75 mm Lenses, Polymer layer too Thick in Center

| Lens | Area | Cap (mm) | Polymer (mm) | Base (mm) | Tot | Tot Dig Caliper |
|---|---|---|---|---|---|---|
| 1 | Center | 0.57 | 0.58 | 0.39 | 1.56 | 1.54 |
|  | Edge 1 | 0.56 | 0.52 | 0.35 | 1.43 | 1.41 |
|  | Edge 2 | 0.55 | 0.53 | 0.43 | 1.51 | 1.51 |
|  | Edge 3 | 0.65 | 0.54 | 0.26 | 1.45 | 1.42 |
|  | Edge 4 | 0.48 | 0.51 | 0.48 | 1.47 | 1.48 |
| 2 | Center | 0.55 | 0.61 | 0.43 | 1.59 | 1.61 |
|  | Edge 1 | 0.61 | 0.52 | 0.41 | 1.54 | 1.53 |
|  | Edge 2 | 0.59 | 0.54 | 0.44 | 1.57 | 1.57 |
|  | Edge 3 | 0.62 | 0.51 | 0.44 | 1.57 | 1.55 |
|  | Edge 4 | 0.65 | 0.52 | 0.40 | 1.57 | 1.55 |
| 3 | Center | 0.55 | 0.61 | 0.56 | 1.72 | 1.71 |
|  | Edge 1 | 0.58 | 0.51 | 0.54 | 1.63 | 1.6 |
|  | Edge 2 | 0.49 | 0.5 | 0.65 | 1.64 | 1.6 |
|  | Edge 3 | 0.66 | 0.54 | 0.44 | 1.64 | 1.61 |
|  | Edge 4 | 0.48 | 0.51 | 0.67 | 1.66 | 1.63 |
| 4 | Center | 0.54 | 0.59 | 0.59 | 1.72 | 1.7 |
|  | Edge 1 | 0.65 | 0.52 | 0.47 | 1.64 | 1.62 |
|  | Edge 2 | 0.43 | 0.51 | 0.71 | 1.64 | 1.64 |
|  | Edge 3 | 0.51 | 0.5 | 0.64 | 1.65 | 1.63 |
|  | Edge 4 | 0.63 | 0.52 | 0.46 | 1.61 | 1.63 |

TABLE 3

70 mm lenses, Polymer too Thin in Center

| Lens | Area | Cap (mm) | Polymer (mm) | Base (mm) | Tot | Tot Dig Caliper |
|---|---|---|---|---|---|---|
| 5198 | Center | 0.64 | 0.43 | 0.47 | 1.54 | 1.52 |
|  | Edge 1 | 0.66 | 0.46 | 0.41 | 1.53 | 1.51 |
|  | Edge 2 | 0.62 | 0.49 | 0.38 | 1.49 | 1.47 |
|  | Edge 3 | 0.69 | 0.52 | 0.32 | 1.53 | 1.51 |
|  | Edge 4 | 0.6 | 0.49 | 0.37 | 1.46 | 1.46 |
| 5199 | Center | 0.63 | 0.46 | 0.47 | 1.56 | 1.53 |
|  | Edge 1 | 0.56 | 0.51 | 0.43 | 1.5 | 1.49 |
|  | Edge 2 | 0.68 | 0.48 | 0.35 | 1.51 | 1.49 |
|  | Edge 3 | 0.7 | 0.5 | 0.31 | 1.51 | 1.5 |
|  | Edge 4 | 0.54 | 0.5 | 0.45 | 1.49 | 1.47 |
| 5201 | Center | 0.61 | 0.47 | 0.47 | 1.55 | 1.52 |
|  | Edge 1 | 0.57 | 0.49 | 0.45 | 1.51 | 1.48 |
|  | Edge 2 | 0.64 | 0.49 | 0.36 | 1.49 | 1.47 |
|  | Edge 3 | 0.71 | 0.5 | 0.31 | 1.52 | 1.5 |
|  | Edge 4 | 0.51 | 0.49 | 0.48 | 1.48 | 1.47 |

In the Table 3 above, the data for lens numbers 5198, 5199 and 5201 (4-base 70 mm Samsung 1.6 lens blanks) shows that

TABLE 1

| Base Curve | 75 mm polymer Thickness (Center) | 75 mm polymer Thickness (Edge 1) | 75 mm polymer Thickness (Edge 2) | 75 mm polymer Thickness (Edge 3) | 75 mm polymer Thickness (Edge 4) |
|---|---|---|---|---|---|
| 2 | 0.55 | 0.50 | 0.46 | 0.40 | 0.50 |
| 2 | 0.57 | 0.48 | 0.52 | 0.51 | 0.51 |
| 3 | 0.70 | 0.50 | 0.55 | 0.52 | 0.47 |
| 3 | 0.71 | 0.51 | 0.51 | 0.54 | 0.53 |
| 4 | 0.58 | 0.50 | 0.44 | 0.49 | 0.51 |
| 4 | 0.56 | 0.49 | 0.48 | 0.49 | 0.52 |
| 5 | 0.50 | 0.49 | 0.48 | 0.49 | 0.48 |
| 5 | 0.52 | 0.48 | 0.48 | 0.45 | 0.50 |
| 7 | 0.52 | 0.47 | 0.51 | 0.50 | 0.48 |
| 7 | 0.50 | 0.50 | 0.54 | 0.49 | 0.51 |

For center-edge comparisons, lens blanks are sawed into sections, the polymer is stained and the polymer thickness is measured at the edges versus the center under a microscope. The following Tables 2 and 3 present data where the center was compared against the edge.

the polymer layers are actually thinner in the center than at the edge. This illustrates that various thickness behavior is possible if perhaps even subtle changes are made in the assembly protocol. Optimization of the effect can be accomplished by reproducibility in the manufacturing process.

The data presented so far compares the center thickness to four isolated points in the periphery. To determine the variation of the thickness of the polymer layer LB #18760 (5-base curve) was sawed in half through the optical center and the sawn edge smoothed with 320 grit sand paper. The optical center was marked on the edge, and every 1 cm along the edge from the optical center was also marked. Photographs were made of the edge at or near all of the marks. After staining, the polymer layer was discernable. A special build with colored (tinted) polymer may be used to improve the measurements. The polymer thickness was measured at all of the marked locations. The result is presented in Table 4 below. The thickness appears to decrease monotonically and smoothly from the optical center.

TABLE 4

| 3-cm Left | 2-cm Left | 1-cm Left | Optical Center | 1-cm Right | 2-cm Right | 3-cm Right |
|---|---|---|---|---|---|---|
| 442 | 462 | 483 | 488 | 480 | 465 | 439 |

Table 4 shows a polymer thickness in LB 18760 along a "chord" passing through the optical center—average of three separate measurements.

If color correction effects attributable to the geometry of the polymer layer are based on certain base curvatures then some lenses may be able to achieve better chromatic aberration correction than other lenses (2-diopter and a 4-diopter composite lens (both 4-base curves) may be different from a 6-diopter lens (3-base curve)). 3-base curve lenses have the most unusual polymer shape according to Table 1.

The thickness variations are not, however, very large. In the previous example the thickness variation was 0.05 mm. Earlier data on some lens blanks showed at most a 0.1 mm thickness variation. New data indicates that 3-base lenses are anomalous and have a 0.2 mm thickness variation.

Two things are necessary for conventional achromatic doublet design. The power of the compensation element must have the opposite sign as the main element, and the dispersion of the compensating element must be larger (the Abbe number smaller) than that of the main element. In a specific embodiment, the polymer layer, or a material between a first sub-lens and a second sub-lens, has positive power and can correct or partially correct the color in a negative composite lens dispensed to a myope, where a composite lens is a lens having a first sub-lens, a second sub-lens, and a polymer material layer between the first sub-lens and the second sub-lens.

Figure 5:
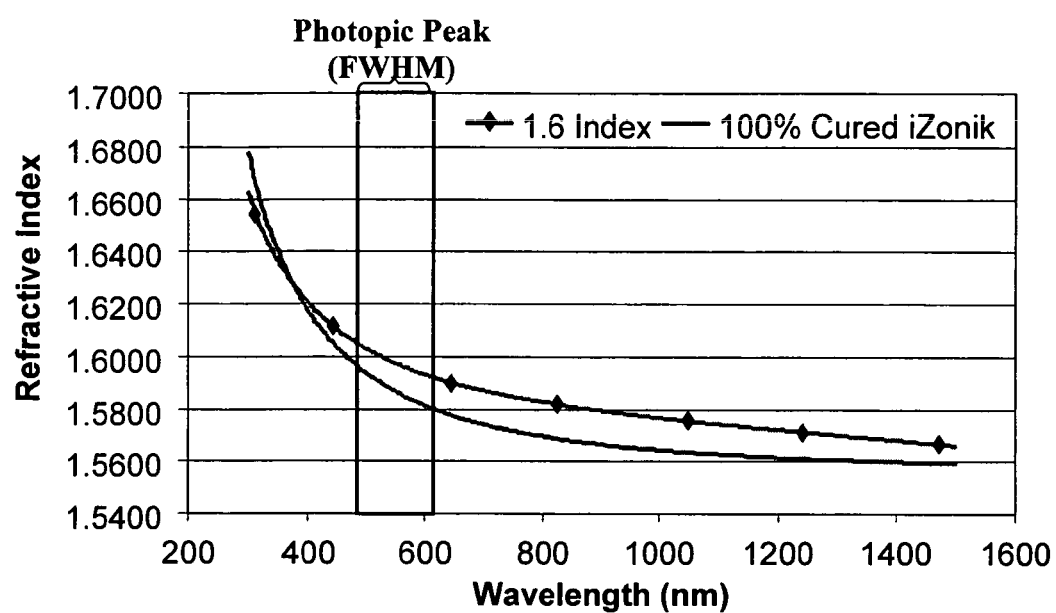
FIG. 5 shows ellipsomatic data for a 1.6 index lens and polymer material.

Ellipsometer data was taken for 1.6 plastic and fully cured polymer material that can be used as a compensating element described herein and also disclosed in U.S. Pat. No. 6,989,938, U.S. Pat. No. 6,712,466, as well as International Published Application No. WO 2006/029264, all of which are hereby incorporated by reference in their entirety. FIG. 5 shows a plot of the ellipsometer data. Clearly, the polymer compensating element material has a larger slope and thus greater dispersion than 1.6 plastic in the scotopic and photopic range.

The polymer material used for the testing was peeled out of microscope slides after a flood at 12 J/cm$^2$. This value is less than the standard flood cure of 60 J/cm$^2$. It should be noted that when material is peeled from a glass cell or lens bank, stress and strain due to boundary conditions is relieved. It is not currently known if this has an effect upon the measurements.

The formulas were given earlier for the calculations using the photopic and scotopic Abbe numbers. Using the ellipsometer data from FIG. 5, the following Table 5 gives the results.

TABLE 5

| Material | Photopic Abbe # | Mesopic Abbe # | Scotopic Abbe # |
|---|---|---|---|
| Polymer | 50 | 27 | 37 |
| 1.6 Plastic | 65 | 35 | 50 |

For reference, the refractive index values used are reproduced in the following Table 6:

TABLE 6

| Wavelength (nm) | 1.6 Plastic | Polymer |
|---|---|---|
| 455 | 1.60928 | 1.60231 |
| 505 | 1.602065 | 1.59273 |
| 510 | 1.60146 | 1.59194 |
| 550 | 1.59719 | 1.58644 |
| 555 | 1.59672 | 1.58584 |
| 610 | 1.59225 | 1.58028 |

In all cases the polymer Abbe number is worse (smaller) than the Abbe number for 1.6 plastic. This can facilitate chromatic correction. The power that is optimum in the polymer layer for chromatic correction can be determined by routine experimentation using various shapes and thicknesses of the polymer layer.

In specific embodiments, one or more high index materials, such as those including $TiO_2$ nano-particles, can be added to the polymer material to further decrease the Abbe number of the polymer formulation used as the compensating element. The advantage of adding high index materials that further reduce the effective Abbe number is that less power is required in the polymer layer for a given degree of color correction.

A further embodiment of the present invention provides methods for educating customers about the advantages of the lenses of the subject invention and/or promoting the sale or use of these lenses. In this embodiment, promotional materials including, but not limited to, pamphlets, newsletters and other written materials describe the deleterious effects of chromatic aberration and explains that the lenses of the subject invention reduce chromatic aberration, especially compared to traditional eyeglass lenses.

General Equations for Chromatic Correction

In order to completely eliminate chromatic aberration at two wavelengths in a lens of power P, the following equations need to be satisfied:

$$P_{lens} + P_{polymer} = P$$

$$\frac{P_{lens}}{V_{lens}} + \frac{P_{polymer}}{V_{polymer}} = 0$$

$V_{lens}$ and $V_{polymer}$ are the appropriate versions of the Abbe numbers of the 1.6 plastic and the fully cured polymer material respectively. The general solution to these equations is $$P_{polymer} = \frac{-P}{\left(\frac{V_{lens}}{V_{polymer}} - 1\right)}$$

$$P_{lens} = \frac{+P}{\left(1 - \frac{V_{polymer}}{V_{lens}}\right)}$$

For a 1-diopter lens using the photopic Abbe numbers calculated based upon the ellipsometric data from FIG. 5 (65 for 1.6 material and 50 for the polymer material), the solution becomes $$P_{iZonik} = -3.3D$$

$$P_{lens} = +4.3D$$

To obtain a good degree of color compensation without large powers for the individual elements, $V_{polymer}$ should be smaller compared to $V_{lens}$. This can be accomplished with the use of other polymer materials, such as titanium dioxide nano-particles, which have relatively poor Abbe values.

Figure 6:
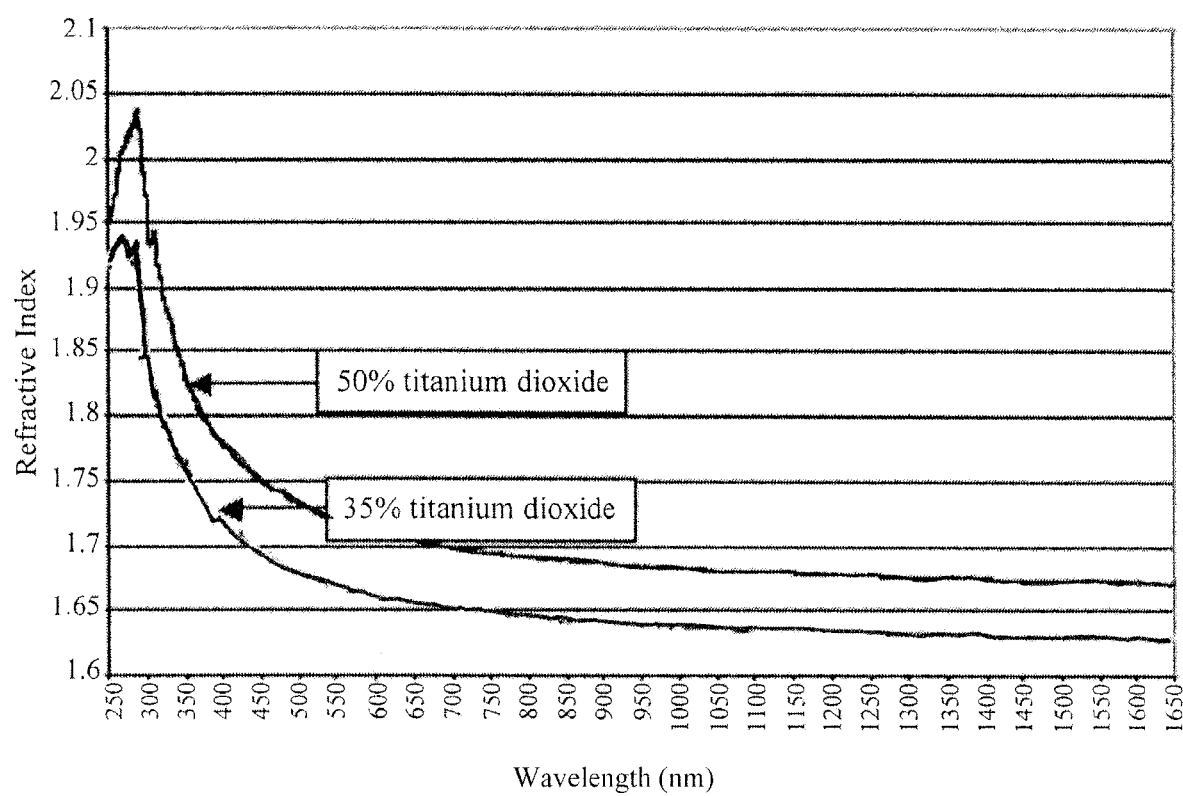
FIG. 6 shows the refractive index spectra of lower titanium dioxide content hybrid coatings.

Titanium dioxide nano-particles can be used as a high-index additive in the polymer formulation. In Tony Flaim, Yubao Wang, Ramil Mercado, "High Refractive Index Polymer Coatings for Optoelectronic Applications," SPIE, Vol. 5250, Advances in Optical Thin Films, paper #20, contained in SPIE Vol. CDS106 Optical Systems Design 2003, the data shown in FIG. 6 is presented.

Estimating the refractive index versus wavelength from the graph for the lowest concentration of $TiO_2$ (35%), which has the index closest to 1.6, the following data was obtained.

TABLE 7

| Wavelength (nm) | Refractive Index |
|---|---|
| 455 | 1.6917 |
| 510 | 1.6750 |
| 555 | 1.6688 |
| 610 | 1.6596 |

Using the data shown in Table 7, a photopic Abbe number of 43 and a mesopic Abbe number of 21 are obtained. These are smaller than the current polymer values (50 and 27 respectively) and so a material based upon titanium dioxide nano-particles can be useful for optimizing chromatic correction in composite lenses in accordance with the subject invention.

A table of the photopic and mesopic Abbe numbers for previously discussed components is presented below in Table 8:

TABLE 8

| Abbe Numbers | Photopic | Mesopic |
|---|---|---|
| $V_{1.6}$ | 65 | 35 |
| $V_{polymer}$ | 50 | 27 |
| $V_{TiO2}$ | 43 | 21 |

The equations for optimum color correction are then presented in the following Table 9:

TABLE 9

| Filler Material | Photopic | Mesopic |
|---|---|---|
| Polymer | $P_{polymer} = -3.3P$ | $P_{polymer} = -3.4P$ |
| Polymer | $P_{1.6} = +4.3P$ | $P_{1.6} = +4.4P$ |
| $TiO_2$ | $P_{TiO2} = -2.0P$ | $P_{TiO2} = -1.5P$ |
| $TiO_2$ | $P_{1.6} = +3.0P$ | $P_{1.6} = +2.5P$ |

The lowest powers are found for titanium dioxide filler and mesopic optimization, but even in that case, the component powers needed are quite substantial compared to the intended power P. All of the "excess" power, however, can be generated inside of the lens blank, either at the back of the cover or the top of the base. A cosmetic penalty of a thicker lens is, however, to be avoided. Otherwise one would be better off to use a non-composite lens of higher Abbe value.

A −2 diopter composite lens is schematically described in FIG. 4A at about twice actual size. The lens blank is 50 mm in diameter and the center thickness of all three layers is 0.5 mm. The base-curve of the base is 5.00, which means that the top of the base is supposed to have a radius of curvature of 106 mm, since base curves powers assume an index of 1.530. In order for the polymer layer to have a constant thickness of 0.5 mm, the radius of the convex polymer surface must be 106.5 mm. In order for the cap to have a constant thickness of 0.5 mm, the radius of the convex surface of the cap must be 107 mm. The power of a thin lens in air is given by the formula $$P = (n-1)\left(\frac{1}{R_1} - \frac{1}{R_2}\right).$$

In the above formula, n is the index of the lens material and $R_1$ and $R_2$ are the two radii of curvature of the two outer spherical surfaces of the lens. With a power of 2-diopters, and index of 1.6 and a cap radius of curvature of 107 mm, the backside radius of curvature is 79 mm.

Now a −2 diopter lens design with full photopic color correction using the polymer compensating element for the central layer will be described. From the above table the equations are:

$$P_{polymer} = -3.3P = 6.6D$$

$$P_{1.6} = +4.3P = -8.6D$$

The outer surfaces can remain the same in order to preserve the overall lens power of −2 diopters. The radius of curvature of the top of the base (and rear of the polymer layer) can be modified to produce 6.6 diopters of plus power for the polymer layer and an additional 6.6 diopters of minus power for the base. According to the thin lens equation above, this can be accomplished by changing the radius of curvature of the top of the base from +106 mm to −621 mm.

As shown in FIG. 4B, the penalty is that the center thickness increases from 1.5 mm to 4.5 mm, with a corresponding thickness increase at the edge. With a design incorporating $TiO_2$ in the polymer material between the base lens (first sub-lens) and the cap lens (second sub-lens), the center thickness would be significantly less. If the blank were less than 50 mm in diameter, the center thickness could be reduced almost proportionately. Alternatively, as shown in FIG. 4C, for color correction only over the central 30 mm diameter section, the center thickness need only be 2.5 mm.

In the remainder of this disclosure the conventional Abbe number will be used rather than the mesopic and photopic Abbe numbers as described above.

Angular Deviation of a Prism—General Behavior

The angular deviation δ due to a prism depends upon the angle of incidence θ and the angle of the prism α and is given by the following equation (1.1) from *Optics*, Eugene Hecht, 4$^{th}$ Edition (2002) Pearson Education, Inc.:

$$\delta = \theta + \sin^{-1}[(\sin \alpha)(n^2 - \sin^2 \theta)^{1/2} - \sin \theta \cos \alpha] - \alpha. \quad (1.1)$$

The aim of the following experiment is to detect differences in the deviation δ that depend upon small differences in the refractive index n for different colors. According to equation (1.1), this can only be accomplished if the prism angle α, which depends upon the location on a lens, and the angle of incidence θ, are both precisely controlled.

The general behavior of the deviation for various angles of incidence and for various prism angles is shown in FIG. 7 from the Newport Research Corporation catalog.

FIG. 7 shows a deviation due to a prism. The minimum deviation occurs when the angle of incidence is such that the ray is parallel to the base of the prism inside of the prism. This is equivalent to having the angles of incidence and exit equal. The angle of incidence has a significant effect on the angular deviation, especially for larger prisms, so the curvature of a pair of spectacles as they wrap around the head will affect it. In spectrometers, prisms are used in the minimum deviation configuration because this produces the least distortion upon the exit beam. If the incident beam is circular in cross section, the exit beam will also be circular at minimum deviation. As the angle of incidence is increased, the deviation increases. However, the circular input beam is converted into an elliptical output beam, so that the separation of wavelengths is not any better. For near normal incidence and small prism angles the deviation is approximately given by the following equation (1.2) from *Optical Formulas*, Ellen Stoner and Patricia Perkins, (1998) Butterworth-Heinemann:

$$\Gamma \approx (n-1)\alpha. \quad (1.2)$$

Because the formula for the deviation $\delta$ depend upon n, which in turn depends upon the wavelength ($\lambda$), the angular deviation depends upon wavelength. This leads to chromatic aberration as a ray of each different wavelength is deviated by a different amount by the optics.

Effective Prism in Eyeglasses

The power of a prism in prism-diopters is defined as the displacement in centimeters divided by the distance in meters. For example, if an object is displaced 1 cm at a distance of 1 m, the displacing optic has an effective prism power of one diopter (see *Dictionary of Optometry and Visual Science*, Michel Millodot, 6$^{th}$ Edition (Butterworh-Heinemann 2004) p. 81). In terms of the angle of deviation $\delta$, this can be written as:

$$P = 100 \tan(\delta). \quad (1.3)$$

According to Prentice's Law, the effective power in prism diopters $P_\Delta$ is related to the lens power $P_L$ in diopters, and the distance d in mm from the optical center according to the following equation (1.4) from *Optical Formulas*, Ellen Stoner and Patricia Perkins, (1998) Butterworth-Heinemann:

$$P_\Delta = \frac{d \cdot P_L}{10}. \quad (1.4)$$

Estimation of Angular Spread Due to a Spectacle Lens

Combining equations (1.2), (1.3) and (1.4) yields:

$$\delta = \tan^{-1}\left[\frac{d \cdot P_L}{1000}\right] \approx (n-1)\alpha. \quad (1.5)$$

An approximate value for $\alpha$ is thus computed as:

$$\alpha = \frac{\tan^{-1}\left[\frac{d \cdot P_L}{1000}\right]}{(n-1)}. \quad (1.6)$$

From equation (1.2) the angular spread $\Delta\delta$ due to color change is given by:

$$\Delta\delta = (\Delta n)\alpha. \quad (1.7)$$

The Abbe number characterizes the dispersion in a material, normalized to the refractive index minus one (also known as the refractivity) at 589.3 nm:

$$Abbe\ \text{Number} \equiv \frac{n_{589nm} - 1}{n_{486nm} - n_{656nm}}. \quad (1.8)$$

The variation in index ($\Delta n$) with color over the range 486 nm to 656 nm can thus be estimated as:

$$n_{486nm} - n_{656nm} \equiv \Delta n_{Abbe} = \frac{n-1}{Abbe\ \text{Number}}. \quad (1.9)$$

The multi-color HeNe has the following laser lines: 633/612/604/594/543 nm. The wavelength extremes are 633 nm and 543 nm, covering a range of 90 nm. The variation in index over the wavelength range of the multi-color HeNe laser ($\Delta n_{HeNe}$) can then be estimated as:

$$\Delta n_{HeNe} \approx \Delta n_{Abbe} \cdot \frac{633nm - 543nm}{656nm - 486nm} = \Delta n_{Abbe} \cdot \frac{90}{170}. \quad (1.10)$$

Combining equations (1.6), (1.7), (1.9) and (1.10) yields an expression for the angular spread due to the color spread in the HeNe laser:

$$\Delta\delta_{90nm} \approx \frac{(n-1)}{Abbe\ \text{Number}} \cdot \frac{90}{170} \cdot \frac{\tan^{-1}\left[\frac{d \cdot P_L}{1000}\right]}{(n-1)} \quad (1.11)$$

$$= \frac{\tan^{-1}\left[\frac{d \cdot P_L}{1000}\right]}{Abbe\ \#} \cdot \frac{90}{170}$$

Using formula (1.11), the following Table 10 was generated, summarizing the expected deviation and angular spread for the multi-color HeNe using a distance from the optical center of 10 mm, lens powers of 2, 4 and 6 diopters and three different ophthalmic plastics. The angles have been converted to position by assuming a distance of one meter between the test lens and the detector.

TABLE 10

| Material | Abbe # | nD | $\delta$ (mm @1 m) | | | $\Delta\delta_{HeNe 90\ nm}$ ($\mu m$ @1 m) | | |
|---|---|---|---|---|---|---|---|---|
| | | | 2D | 4D | 6D | 2D | 4D | 6D |
| CR39 | 59 | 1.498 | 20.0 | 40.1 | 60.5 | 179 | 359 | 538 |
| Samsung 1.6 | 42 | 1.592 | 20.0 | 40.1 | 60.4 | 252 | 504 | 755 |
| Polycarbonate | 30 | 1.586 | 20.0 | 40.1 | 60.4 | 353 | 706 | 1060 |

Table 10 shows estimated displacements and displacement ranges at one meter.

At a distance of one meter, the deviations produce substantial displacements at the detector plane ranging from 20 mm to 60 mm, depending upon the lens power. The variation in displacement due to the HeNe laser color variation of 90 nm is considerably smaller and ranges between 0.18 mm and 1.1 mm. This is ideal for direct detection with a CCD or CMOS camera chip. With a detector pixel pitch of the order of 5 µm, the variation in position translates to the range of 36-220 pixels. The centroid of a Gaussian irradiance distribution can be interpolated to sub-pixel accuracy, so digitization of the position is not limited to the pixel size.

The variation in displacement at the detector due to the 90 nm spread of the HeNe laser is small but easily measurable. A larger spread is obtained by moving further from the optical center, or by using a higher lens power. As mentioned earlier, using larger angle of incidence is not particularly useful because a circular input beam becomes distorted into an elliptical output beam.

Of particular interest is the angular spread near the photopic peak. The HeNe generated wavelengths of 594 nm and 543 nm best bracket the photopic peak, and represent a wavelength span of 51 nm. The version of equation (1.11) appropriate in this case is given by $$\Delta\delta_{51nm} \approx \frac{\tan^{-1}\left[\frac{d \cdot P_L}{1000}\right]}{Abbe\ \#} \cdot \frac{51}{170} \quad (1.12)$$

The variation in angular deviation over this range is reduced by a factor of 51/90 from those presented in Table 10, because the variation in wavelength is less than the full 90 nm variation possible with the 5-color HeNe laser. In Table 11 the deflection differences at one meter are estimated for the two wavelengths (594 nm and 543 nm) bracketing the photopic peak.

TABLE 11

| Material | Abbe # | nD | $\Delta\delta_{51\,nm}$ (µm @1 m) 2D | 4D | 6D | $\Delta\delta_{51\,nm}$ (pixels @1 m) 2D | 4D | 6D |
|---|---|---|---|---|---|---|---|---|
| CR39 | 59 | 1.498 | 101 | 203 | 305 | 19.4 | 39.0 | 58.7 |
| Samsung 1.6 | 42 | 1.592 | 143 | 286 | 428 | 27.5 | 55.0 | 82.3 |
| Polycarbonate | 30 | 1.586 | 200 | 400 | 601 | 38.5 | 76.9 | 115.6 |

Table 11 shows estimated displacement differences at one meter for the two wavelengths bracketing the photopic peak, and where the pixel pitch is 5.2 µm.

Judging from Table 11, in order to detect the difference between the different materials near the photopic peak, the experiment must have a resolution of a few pixels for the case of 2-diopter lenses. Each pixel represents 5.2 micro-radians, so the resolution must be of the order of 10-15 micro-radians.

Factors that might affect the resolution of the experiment include the following:
- The various color laser beams should pass through the same location on the lens blank in order to experience the same effective prism value
- The various color laser beams should have the same angle of incidence at the lens blank in order to eliminate this source of deflection variability
- The beam quality should be such that the centroid of the irradiance pattern on the detector array can be reliably interpolated to sub-pixel accuracy
- The variation in lens power should not be too great over the diameter of the laser beam, or the irradiance profile on the detector will be distorted
- The laser beam pointing stability should be adequate
- Thermal expansion of the mounting hardware should not be sufficient to disrupt the alignment Each of these issues is examined in more detail in the following sections.

Sensitivity to Location of Incidence

Using equation (1.12) which in turn assumes approximately normal incidence, distances from the optical center of 9 mm, 10 mm, and 11 mm, and a lens power of 2-diopters, the variation in deflection between 543 nm and 594 nm is presented in Table 12.

TABLE 12

| $\Delta\delta_{51\,nm}$ (pixels @ 1 m) Material | Abbe # | d = 9 mm 2D | 4D | 6D | d = 10 mm 2D | 4D | 6D | d = 11 mm 2D | 4D | 6D |
|---|---|---|---|---|---|---|---|---|---|---|
| CR39 | 59 | 17.6 | 35.2 | 52.8 | 19.4 | 39.0 | 58.7 | 21.5 | 43.0 | 64.4 |
| Samsung 1.6 | 42 | 24.7 | 49.4 | 74.1 | 27.5 | 55.0 | 82.3 | 30.2 | 60.4 | 90.5 |
| Polycarbonate | 30 | 34.6 | 69.2 | 103.7 | 38.5 | 76.9 | 115.6 | 42.3 | 84.6 | 126.7 |

Table 12 shows estimated displacement differences in pixels at one meter for the two wavelengths bracketing the photopic peak, for various distances from the optical center.

Table 12 shows that the value of $\Delta\delta$ is not very sensitive to the exact displacement of the laser beams from the optical center. If one allowed the position to vary ±1 mm between samples of different materials, it would still be possible to differentiate Samsung-1.6 from polycarbonate and CR39.

The more difficult issue involves how much the distance from the optical center can vary between two colors when measuring a given lens. To answer this question, equation (1.1) was used to compute the displacements at one meter for 543 nm and 594 nm. Samsung-1.6 material, 2-diopters lens power and normal incidence was assumed. The nominal index of 1.592 was used to compute the prism angle α via equation (1.6). To calculate the displacements at 543 nm and 594 nm, the refractive indices obtained from ellipsometry were used (n=1.59787 and n=1.59343 respectively). The results are presented in Table 13.

TABLE 13

| d (mm) | δ (µm @ 543 nm) | δ (µm @ 594 nm) | $\Delta\delta_{51\,nm}$ (µm) | Mix Error (µm) |
|---|---|---|---|---|
| 10.00 | 20211.6 | 20061.4 | 150.2 | — |
| 11.00 | 22235.8 | 22070.6 | 165.2 | 2000 |
| 9.00 | 18188.2 | 18053.0 | 135.2 | 2000 |
| 10.10 | 20414.0 | 20262.3 | 151.7 | 200 |
| 9.90 | 20009.2 | 19860.5 | 148.7 | 200 |
| 10.05 | 20312.8 | 20161.9 | 150.9 | 100 |
| 9.95 | 20110.4 | 19961.0 | 149.4 | 100 |

TABLE 13-continued

| d (mm) | δ (μm @ 543 nm) | δ (μm @ 594 nm) | Δδ$_{51\,nm}$ (μm) | Mix Error (μm) |
|---|---|---|---|---|
| 10.01 | 20231.8 | 20081.5 | 150.3 | 20 |
| 9.99 | 20191.3 | 20041.3 | 150.0 | 20 |

Table 13 shows displacements in microns at a distance of one meter for a 2-diopter Samsung-1.6 lens, approximately 10 mm from the optical center, and the resulting Δδ values. The effect of error in the distance from optical center if both colors have the same d value is shown in column 4. If only one of the colors has a d value of 10 mm, the error is shown in column 5.

The value of Δδ for d=10 mm is 150.2 microns. If both colors are incident at exactly the same location but as much as 1 mm off from the nominal 10.00 mm offset from the optical center, there is at most a 15 μm error in the computed value of Δδ. However, if the 543 nm result is taken at 10.10 mm, and the 594 nm result at 10.00 mm, then the value of Δδ becomes 352.6, which is in error by 202.4 μm or more than 100%. Keeping the offset error to 0.010 mm keeps the error in Δδ to about 20 μm or 13%. The result is that the different color laser beams must be incident at the same location on a lens blank to within about 10 microns in order to avoid large errors. Here, 10 microns is about 2 pixels on the CMOS camera.

Sensitivity to Angle of Incidence

The angular deviation δ due to a prism depends upon the angle of incidence θ as given by equation (1.1). Using equation (1.6), for a 2-diopter lens 10 mm from the optical center, and assuming a refractive index of 1.592, the value of α is 1.9 degrees or 0.0333 radians. A nominal angle of incidence θ can be calculated based upon the lens base curve, and the offset from the optical center d, assuming that the optical center is located at the geometric center of the lens blank. See FIG. 7.

Figure 7A:
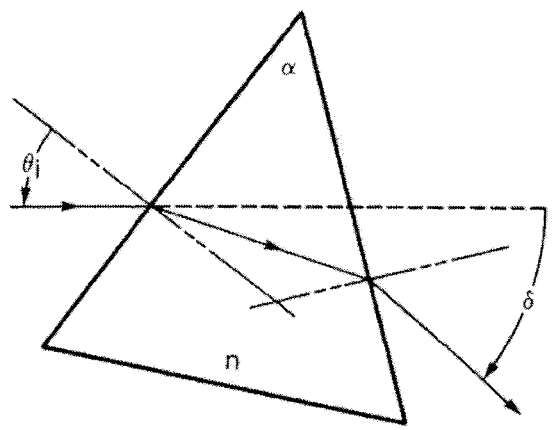
FIGS. 7A-7B show deviation due to a prism.
Figure 7B:
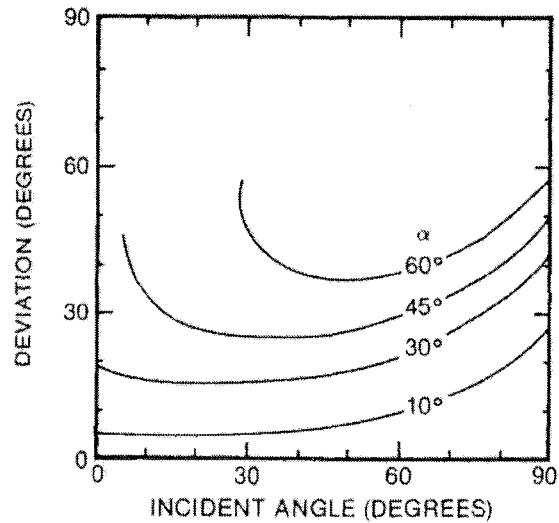
Figure 8:
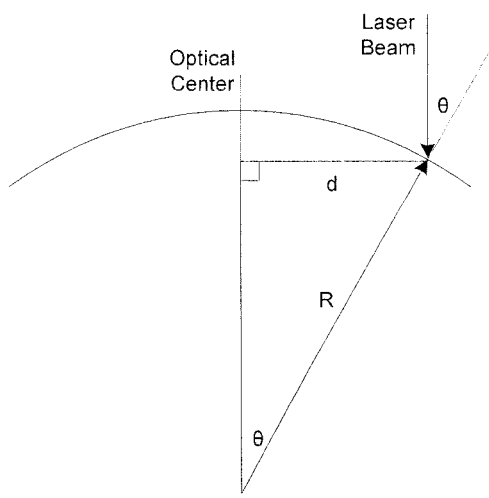
FIG. 8 shows the geometry specifying the angle of incidence.

FIGS. 7A-7B show the geometry specifying the angle of incidence.

Referring to FIG. 6, the angle of incidence is given by $$\theta = \sin^{-1}\left(\frac{d}{R}\right) \quad (1.13)$$

The front radius of curvature R is related to the lens blank base curvature (BC) via the formula $$BC = \frac{1.530 - 1}{R}. \quad (1, 14)$$

Combining equations (1.13) and (1.14) yields $$\theta = \sin^{-1}\left(\frac{d \cdot BC}{0.53}\right). \quad (1.15)$$

For a base curve of 4.0, and a 10 mm offset from the optical center, the nominal angle of incidence θ is 4.3 degrees, or 0.0755 radians. For the above estimated values of α and θ, the deviation δ, according to Equation (1.1), is 5.33 degrees or 0.093 radians. The effect of variation in the angle of incidence is shown in Table 14.

TABLE 14

| Material | θ (radians) | δ @ 543 nm (μrad) | δ @ 594 nm (μrad) | Δδ (μrad) | Δδ ($\delta_{nom\theta} - \delta_\theta$) | Δδ ($\delta_\theta - \delta_{nom\theta}$) |
|---|---|---|---|---|---|---|
| CR39 | 0 | 20174 | 20049 | 125 | | |
| CR39 | nominal | 92606 | 92481 | 125 | — | — |
| CR39 | nom + 10 μrad | 92616 | 92491 | 125 | 115 | 134 |
| CR39 | nom + 100 μrad | 92702 | 92577 | 125 | 29 | 221 |
| CR39 | nom + 10 mrad | 102184 | 102059 | 125 | −9453 | 9703 |
| CR39 | 0.5 | 497746 | 497614 | 131 | | |
| Samsung 1.6 | nominal | 93142 | 92992 | 150 | — | — |
| Samsung 1.6 | nom + 10 μrad | 93152 | 93002 | 150 | 141 | 160 |
| Samsung 1.6 | nom + 100 μrad | 93239 | 93089 | 150 | 54 | 247 |
| Samsung 1.6 | nom + 10 mrad | 102788 | 102638 | 150 | −9496 | 9796 |
| Samsung 1.6 | 0.5 | 501515 | 501357 | 157 | | |

Table 14 shows the deviations δ and variation in deviations Δδ due to color differences for various angles of incidence θ. If both colors have the same θ, then the Δδ value is unaffected for even large changes in θ. However, as shown in Table 14, Δδ is dramatically affected if the colors have different values of θ.

Table 14 shows that the difference in the deviation for the two colors (Δδ) is unaffected by angle of incidence over a large range of angles, provided that both colors have the same angle of incidence. However, if the colors do not have the same angle of incidence, the computed value of Δδ will be dramatically affected. In order to be able to distinguish CR39 lenses from Samsung 1.6 lenses, the difference in angle of incidence between the colors should be kept to 10 wad or less.

Experimental Design

Figure 9:
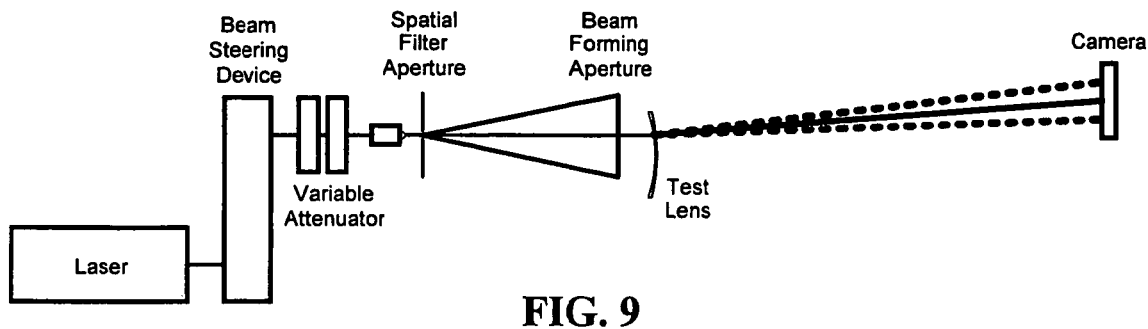
FIG. 9 shows a schematic of the experimental setup; the beam forming aperture, spatial filter aperture, the test lens and the camera are not moved during measurements with the various wavelengths.

In order to make the location-of-incidence and the angle-of-incidence identical for all of the laser beam wavelengths, the arrangement depicted in FIG. 9 was devised.

Originally it was thought that if the various color laser beams were generated from the same laser, then all of the beams paths would be coincident. However, it was determined that the wavelength tuning mechanism in the multicolor HeNe (a 5-Line tunable helium-neon laser system, model #LSTP-1010 from Research Electro Optics, Inc., 5505 Airport Blvd., Boulder, Colo. 80301) used in the experiment causes emission at slightly different angles depending upon the wavelength. A further issue is that if testing is desired at other wavelengths, requiring the use of other lasers, some mechanism or procedure must be used to align the beams adequately coincident in both position and angle.

FIG. 9 shows a schematic of the experimental setup; the beam forming aperture, spatial filter aperture, the test lens and the camera are not moved during measurements with the various wavelengths.

The experimental arrangement in FIG. 9 automatically ensures that all of the beams begin at the same location. The "beam forming aperture" essentially specifies an initial location on the beam path. The relationship between the spatial filter pinhole and the beam forming aperture ensures that the angle of incidence is identical for beams of all wavelengths.

The divergence of the generated beam is determined by the separation of the spatial filter aperture and the beam forming aperture, as well as the diameter of the beam forming aperture ($D_{BFA}$). The full divergence angle is the larger of:

$$\theta \approx \frac{D_{BFA}}{X_{SFA-BFA}} \text{ limited by the subtended angle of the aperture} \quad (1.17)$$

$$\theta \approx \frac{4\lambda}{\pi D_{BFA}} \text{ limited by diffraction}$$

The divergence of the output beams must not be so large that the spot size at the camera becomes too large to be adequately sampled, or that the error in the centroid determination unduly increases.

Various aspects and advantages of the experimental setup depicted in FIG. 9 include the following:
- The spatial filter aperture and the beam forming aperture are not moved during the measurement process, insuring that the generated beam path is stable
- The test lens is not moved during testing of the various wavelengths, insuring that the location and angle of incidence are stable as the wavelength is changed
- After recording the un-deviated beam position (no test lens condition), the camera is not moved during testing of the various wavelengths
- The only operator adjustment during the measurement process is to steer the beams into the spatial filter so that adequate levels of beam intensity are obtained
- The spatial filter insures that the beam quality is adequate to obtain reproducible centroid location on the camera One experimental point of considerable importance, is that the CCD or CMOS camera preferably does not have a protective coverglass or window. Typically, camera chips include such a window to protect the sensor and the wirebonds. However, such a window will act as an etalon, producing a fringe pattern on the sensor depending upon the wavelength and angle at which a laser beam arrives at the sensor. The result is that the centroid is deflected randomly, resulting in instrument error in the effective Abbe value determination.

Laser Beam Diameter and Lens Power Variation

The effective prism in the test lens varies linearly with distance from the optical center according to Prentice's Law. Hence the deviation $\delta$ depends upon the distance from the optical center. If the laser beam diameter were so large that the effective prism varied significantly over the beam diameter, then the range of deviations sampled could become significant compared to the deviation at the beam center, which is an undesirable situation. Mathematically, the desirable situation is given by:

$$D_{laser} \cdot \frac{\partial \delta}{\partial d} << \delta \quad (1.18)$$

The derivative is:

$$\frac{\partial \delta}{\partial d} = \frac{\partial}{\partial d}\tan^{-1}\left[\frac{d \cdot P_L}{1000}\right] = \frac{\frac{P_L}{1000}}{1+\left(\frac{d \cdot P_L}{1000}\right)^2} \quad (1.19)$$

Combining equations (1.18) and (1.19), using equation (1.5) obtains:

$$D_{laser} \cdot \frac{\frac{P_L}{1000}}{1+\left(\frac{d \cdot P_L}{1000}\right)^2} << \tan^{-1}\left[\frac{d \cdot P_L}{1000}\right] \quad (1.20)$$

Using $P_L$=2 diopters and d=10 mm obtains:

$$(2\times10^{-3}/\text{mm})\cdot D_{laser} << 0.02 \text{ radians} \quad (1.21)$$

A laser beam with a diameter of 1 mm or less satisfies equation (1.20). For more powerful lenses, and/or at distances further from the optical center than 10 mm, the calculation of equation (1.20) has to be rechecked.

Thermal Expansion Issues

Changes in temperature will result in changes in position of the various optical components used in the experimental setup. The critical location is where the laser beam intersects the lens, and this should not change by more than 10 microns between measurements with different colors. The optical components are supported by either aluminum or steel mounts to a height of roughly 18 cm. The room is climate controlled, but a change in temperature of 3 degrees centigrade may nevertheless be possible. The expansion coefficient of aluminum is approximately $23\times10^{-6}/°$ C., and the expansion coefficient for 304 stainless steel is approximately $10\times10^{-6}/°$ C. The difference between the coefficients for aluminum and stainless steel is about $13\times10^{-6}/°$ C. The vertical displacement possible with a 3° C. temperature change is given by:

$$\text{displacement}=(13\times10^{-6}/° \text{ C.})(3° \text{ C.})(0.18 \text{ m})=7 \text{ microns} \quad (1.22)$$

This is an acceptable change because it is less than 10 microns. However, drastic temperature changes are to be avoided during data collection.

Perhaps of more concern is the lens itself. Polymers in general have large coefficients of thermal expansion. See Table 15.

TABLE 15

| Polymer | Expansion Coefficient (per ° C. @ RT) |
| --- | --- |
| CR39 | 100 |
| PC | 70 |
| PMMA | 70 |

Table 15 shows linear expansion coefficients for optical polymers

For a temperature change of 3° C., a lens blank diameter of 5 cm, and the expansion coefficient of CR39, the diameter of the lens blank would change by 15 microns. The lens holder is self-centering so the largest change in position would be 7.5 microns for a position near the lens blank edge. Thus, thermal expansion of the lens material is not of particular concern. However, when the lens is handled its temperature may increase more than 3° C., and adequate time for relaxation to room temperature should be allowed before data is taken.

Experimental Data

A version of the experimental setup depicted in FIG. 9 has the parameters given in Table 16.

TABLE 16

| Parameter | Value |
|---|---|
| Spatial Filter Aperture Diameter | 10 μm |
| Beam Forming Aperture (BFA) Diameter | 500 μm |
| Distance Between Apertures | 50 cm |
| Distance from Lens to Camera | 50 cm |
| Distance from BFA to Lens | 2.5 cm |

To test the pointing accuracy, the following experiment was done. Without a test lens present, various color laser beams were repeatedly input into the spatial filter and the location of the centroid on the data camera recorded. No matter how the beam steering device was adjusted or which color was input, the vertical position of the centroid remained within ±0.25 pixels, corresponding to ±2.6 micro-radians. This is adequate pointing accuracy.

To better ensure the accuracy of the measurements, the following procedure was added. Measurements were taken on a lens blank with a prescription of pure sphere (i.e. no cylinder), and then repeated three more times, rotating the lens blank 90-degrees each time. Hence, on each lens blank measurements were taken, at a given radius from the optical center, at four locations distributed evenly around the lens. The final answer is the average of the four measurements. If the measurements are not similar and thus consistent, it is likely that pointing errors or positioning errors are dominating the measurement. However, if the four measurements indicate reproducibility, then pointing and positioning errors are not likely to be dominating the measurements, and the measurements can be considered accurate.

The results of the experiment for three lenses and the photopic bracketing wavelengths of 543 nm and 594 nm are given in Table 17. All of the lenses were measured 8.00 mm from the optical center. At each position the deviation for each laser color was measured five times and the results averaged. All of the lenses measured −2.00 diopters on a Marco lensometer.

TABLE 17

| Lens | $\Delta\delta_{51\,nm}$ (μm) Position 1 | $\Delta\delta_{51\,nm}$ (μm) Position 2 | $\Delta\delta_{51\,nm}$ (μm) Position 3 | $\Delta\delta_{51\,nm}$ (μm) Position 4 | $\Delta\delta_{51\,nm}$ (μm) Average | Std. Dev. (μm) |
|---|---|---|---|---|---|---|
| 1.6 lens | 63.7 | 68.9 | 59.5 | 63.2 | 63.8 | 3.9 |
| Composite lens 11062 | 50.4 | 60.6 | 55.4 | 62.9 | 57.3 | 5.6 |
| Composite #1 | 63.8 | 67.3 | 76.7 | 68.8 | 69.1 | 5.4 |

The standard deviation due to the repeated measurements at each position is in general smaller than the standard deviation of the measurements at the four positions. This indicates that at least some of the variation in the measurements at the four positions is due to variation in the lens blank itself.

See Table 18 for the effective Abbe numbers of several test lenses:

TABLE 18

| Lens | $\Delta\delta_{51\,nm}$ (μm) Average | Effective Abbe Number |
|---|---|---|
| 1.6 lens | 63.8 | 42 |
| Composite lens 11062 | 57.3 | 47 |
| Composite #1 | 69.1 | 39 |

The composite lens #11062 has an effective Abbe number of 47, well in excess of the 42 value characteristic of the base plastic material. Composite lens #1 is similar to the composite lens in construction, but the internal radii of curvature are different, and thus the power of the polymer layer internal to the lens is also different. In the case of Composite lens #1, the power of the polymer layer is negative, causing the effective Abbe number to fall below that of the base plastic. In the case of the composite lens #11062, the power of the internal polymer layer is positive, elevating the effective Abbe number above that of the base plastic. By controlling the internal radii of curvature, and thus the internal power of the polymer layer, much greater increases in the effective Abbe number are possible.

Preliminary Data on a Range of Lens Materials

An earlier version of the experimental setup depicted in FIG. 9 has the parameters given in Table 19.

TABLE 19

| Parameter | Value |
|---|---|
| Spatial Filter Aperture Diameter | 20 μm |
| Beam Forming Aperture (BFA) Diameter | 300 μm |
| Distance Between Apertures | 31 cm |
| Distance from Lens to Camera | 50 cm |
| Distance from BFA to Lens | 2.5 cm |

The pointing accuracy for this set of measurements is not automatically as good as for the parameters given in Table 16. However, the results of the known materials scale with Abbe number in precisely the expected fashion, indicating the accuracy of the measurements.

The results of the experiment for five lenses and the photopic bracketing wavelengths of 543 nm and 594 nm are given in Table 20. All of the lenses were measured 8.00 mm from the optical center. All of the non-composite lenses measured −2.00 diopters on the Marco lensometer as measured by LW. The composite lens measured −2.12 diopters.

TABLE 20

| Lens | Wavelength (nm) | δ (mm) | Std. Dev. (mm) | $\Delta\delta_{51\,nm}$ (μm) |
|---|---|---|---|---|
| CR39 | 594 | 8.708 | 0.0009 | |
| CR39 | 543 | 8.747 | 0.0020 | 39 |
| Composite lens | 594 | 8.463 | 0.0016 | |
| Composite lens | 543 | 8.511 | 0.0050 | 48 |
| Samsung 1.6 | 594 | 8.610 | 0.0022 | |
| Samsung 1.6 | 543 | 8.669 | 0.0005 | 59 |
| Polycarbonate | 594 | 8.950 | 0.0014 | |
| Polycarbonate | 543 | 9.028 | 0.0028 | 78 |

Five measurements were taken at each wavelength involving the process of recording the un-deviated beam position, inserting the lens and measuring the deviated beam position. The standard deviation is computed from the five measurements and is relatively small compared to the difference in displacement for the two wavelengths, in all cases.

The data indicates that CR39 has the best (least) dispersion over the photopic range and that Polycarbonate has the worst (most) dispersion. The Samsung 1.6 lens is in between. This is to be expected based upon the Abbe numbers for the three pure materials. So the measurements with the experimental setup give the correct ordering for the non-composite lenses. The composite lens has less dispersion over the photopic range than pure Samsung 1.6. This is consistent with the non-constant polymer layer thickness model, which predicts less dispersion for a negative composite lens than for a Samsung 1.6 lens. This is also consistent with the visual observation that composite spectacles for strong myopic correction induce less color distortion than lenses made of other high index plastics.

If the laser displacement data is accurate, then one would expect that $\Delta\delta_{51nm}$ would scale with the Abbe number of the materials. In particular, one would expect $\Delta\delta_{51nm}$ to vary in a linear fashion with the inverse of the Abbe number. Furthermore, for infinite Abbe number $\Delta\delta_{51nm}$ should extrapolate to a value of zero. In FIG. 11, $\Delta\delta_{51nm}$ is plotted versus the inverse Abbe number and precisely this behavior is demonstrated. This supports the validity of the measurements.

Incidentally, the graph illustrates how one could determine the effective Abbe number for a composite lens such as the composite lens. The laser measurements gave a displacement variation value of $\Delta\delta_{51nm}$=48 microns for the composite lens. Solving the best fit line for the inverse Abbe number returns a value of 0.0202, or an effective Abbe number of 50, well in excess of the 42 value attributed to Samsung 1.6 plastic.

Figure 10:
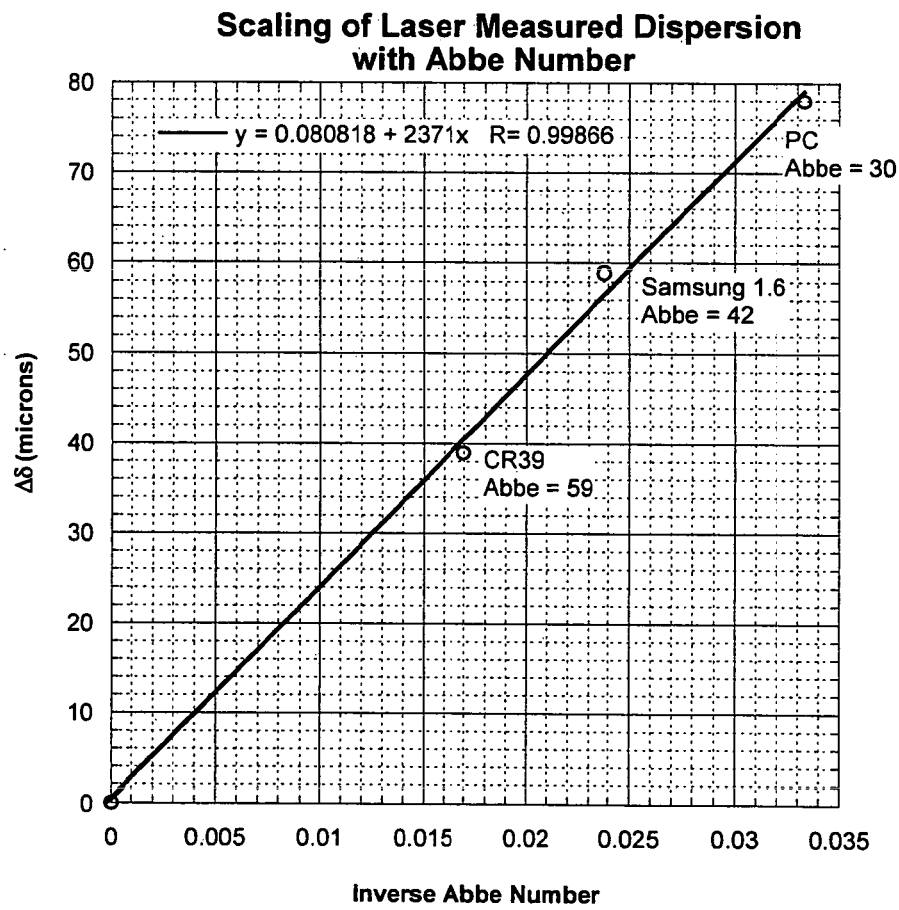
FIG. 10 shows the laser measured data scales with the Abbe number.

FIG. 10 shows the laser measured data scales with the Abbe number as it should.

In summary, composite lenses can correct for chromatic aberrations due to the lens material by proper shaping of the internal polymer layer, which has an Abbe value that preferably differs substantially from that of the base plastic. Measurements demonstrate that composite lenses do indeed correct for chromatic aberrations and provide a higher effective Abbe number than any other high-index plastic. By designing the shape of the internal polymer layer, an even larger effective Abbe number can be obtained.

TABLE 21

| Material | Refractive Index | Abbe Value |
|---|---|---|
| Polycarbonate | 1.59 | 30 |
| 1.6 Plastic | 1.60 | 42 |
| 1.6 composite | 1.60 | 47 |
| 1.67 Plastic | 1.67 | 32 |

Derivation of a Formula for the Effective Abbe Value of a Composite Lens

Mathematically, the power of a lens in diopters P is related to the focal length f in meters by the relation $$P = \frac{1}{f} \quad (0.1)$$

The conventional Abbe number is defined by the indices of refraction $n_\lambda$ at three different wavelengths according to $$V = \frac{n_{587.6nm} - 1}{n_{486.1nm} - n_{656.3nm}}. \quad (0.2)$$

The basic design equations for an achromatic doublet are given by $$P_1 + P_2 = P \quad (0.3)$$

$$\frac{P_1}{V_1} + \frac{P_2}{V_2} = 0 \quad (0.4)$$

P is the power in diopters of the lens, which is composed of two other sub-lenses $P_1$ and $P_2$ that have opposite sign. Equation (0.3) assumes that the two lenses are thin lenses that are adjacent so that the powers directly add. For a finite separation between the two sub-lenses there is a correction to the power formula. $V_1$ and $V_2$ are the Abbe numbers of the two sub-lenses. The sub-lens with power of the same sign as P has the larger Abbe number of the two lenses and thus has smaller dispersion. The sub-lens with power of the opposite sign as P has the smaller Abbe number of the two lenses, and thus has larger dispersion.

Equation (0.4) can be re-written as $$(n_{1d} - 1) \cdot \left(\frac{1}{R_{1a}} - \frac{1}{R_{1b}}\right) \cdot \frac{(n_{1B} - n_{1R})}{(n_{1d} - 1)} + \quad (0.5)$$
$$(n_{2d} - 1) \cdot \left(\frac{1}{R_{2a}} - \frac{1}{R_{2b}}\right) \cdot \frac{(n_{2B} - n_{2R})}{(n_{2d} - 1)} = 0.$$

In equation (1.4) the subscript "B" for blue refers to 486.1 nm and the subscript "R" for red refers to 656.3 nm. The subscripts "a" and "b" refer to the two surfaces of the lens. Equation (0.5) can be re-arranged as $$(n_{1B} - 1) \cdot \left(\frac{1}{R_{1a}} - \frac{1}{R_{1b}}\right) - (n_{1R} - 1) \cdot \left(\frac{1}{R_{1a}} - \frac{1}{R_{1b}}\right) + \quad (0.6)$$
$$(n_{2B} - 1) \cdot \left(\frac{1}{R_{2a}} - \frac{1}{R_{2b}}\right) - (n_{2R} - 1) \cdot \left(\frac{1}{R_{2a}} - \frac{1}{R_{2b}}\right) =$$
$$(P_{1B} - P_{1R}) + (P_{2B} - P_{2R}) = 0$$

What equation (0.6) says is that the difference in power between blue and red for lens #1 is exactly compensated by the difference in power of lens #2 between blue and red. Remember that $P_1$ and $P_2$ have opposite sign.

Now suppose that the compensation is not perfect, but rather that only partial compensation is provided by the two sub-lenses. One could then write equation (0.6) as $$\frac{P_1}{V_1} + \frac{P_2}{V_2} = (P_{1B} - P_{1R}) + (P_{2B} - P_{2R}) \quad (0.7)$$
$$= (P_{1B} + P_{2B}) - (P_{1R} + P_{2R})$$
$$= (P_B - P_R)$$
$$\equiv \frac{P}{V_{\text{effective}}}$$

Therefore define the effective Abbe number as:

$$\frac{P_1}{V_1} + \frac{P_2}{V_2} = \frac{P}{V_{\text{effective}}} \quad (0.8)$$

Solving equation (0.8) for $V_{effective}$ yields $$V_{effective} = \frac{V_1 V_2 (P_1 + P_2)}{V_2 P_1 + V_1 P_2} \qquad (0.9)$$

Defined in this way, $V_{effective}$ has all of the correct limits as follows $$P_1 \to 0 \qquad V_{effective} \to V_2 \qquad (0.10)$$

$$P_2 \to 0 \qquad V_{effective} \to V_1$$

$$\frac{P_1}{V_1} + \frac{P_2}{V_2} \to 0 \quad V_{effective} \to \infty$$

The formula for the effective Abbe number given in equation (0.9) simply requires the powers and Abbe numbers of the two sub-lenses.

Derivation of the Effective Abbe Value Based Upon Laser Measurements

If complete or partial color correction is provided in an iZon lens by shaping the internal iZonik layer, the effective Abbe number will increase. In this section a formula for the effective Abbe number based upon measured data is derived.

Transverse Chromatic Aberration (TCA) is Defined by $$TCA \equiv \frac{P_\Delta}{V} = \frac{P_\Delta}{V_{photopic}} \qquad (0.11)$$

The photopic Abbe number will be used instead of the traditional Abbe number. The diopters of prism $P_A$ is defined by equation (1.4). For small angles, the deviation $\delta$ due to a prism with apical angle $\alpha$ and index n is given by equation (1.2). Combining these equations with (0.11) yields $$TCA = \frac{100 \cdot \tan(\alpha(n_{555\,nm} - 1)) \cdot (n_{510\,nm} - n_{610\,nm}) \cdot (170.2/100.0)}{n_{555\,nm} - 1} \qquad (0.12)$$

For Small Angles $$\tan(\delta) \approx \delta. \qquad (0.13)$$

The formula for TCA can be reduced to $$TCA \approx 100 \cdot \alpha \cdot (n_{510nm} - n_{610nm}) \cdot (170.2/100.0). \qquad (0.14)$$

In the above formula, $\alpha$ must be in radians. The Ophthonix lens chromatic aberration diagnostic measures the displacement r of laser beams of various wavelengths over a distance R due to the effective prism of a lens at the measurement location.

$$r = R \cdot \tan(\delta) = R \cdot \tan(\alpha \cdot (n-1)) \approx R \cdot \alpha \cdot (n-1) \qquad (0.15)$$

Currently, data is taken at the wavelengths of 633, 612, 604, 594, 543 and 473 nanometers. If the data best covering the photopic peak is subtracted, one obtains $$r_{543nm} - r_{594nm} = R \cdot \alpha \cdot (n_{543nm} - n_{594nm}) \qquad (0.16)$$

The above formula can be re-written as $$\frac{100 \cdot (r_{543\,nm} - r_{594\,nm})}{R} = 100 \cdot \alpha \cdot (n_{543\,nm} - n_{594\,nm}) \qquad (0.17)$$

The right hand side is very similar to the formula for TCA developed earlier, except that different wavelengths are utilized. If one linearly scales the index variation to match that in the photopic Abbe number formula, one obtains an experimental value for the TCA:

$$TCA = 100 \cdot \alpha \cdot (n_{510\,nm} - n_{610\,nm}) \cdot (170.2/100.0) \qquad (0.18)$$

$$\approx 100 \cdot \alpha \cdot (n_{543\,nm} - n_{594\,nm}) \cdot \frac{170.2}{100.0} \cdot \frac{610 - 510}{594 - 543}$$

$$= 100 \cdot \frac{170.2}{51} \cdot \frac{(r_{543\,nm} - r_{594\,nm})}{R}$$

The effective Abbe number is given by rearranging equation (0.11) as $$V_{effective} = \frac{P_\Delta}{TCA} \qquad (0.19)$$

The prism diopters utilized in the experiment can be estimated using equation 1.4 as $$P_\Delta = 100 \cdot \tan(\delta) = 100 \cdot \frac{r_{555\,nm}}{R} \qquad (0.20)$$

In equation (0.20) the displacement at the photopic peak of 555 nm has appropriately been used to characterize the prism power. However, laser displacement measurements are only taken at the nearby wavelengths of 543 nm and 594 nm. A good approximation of $r_{555nm}$ is given by $$r_{555} \approx r_{543\,nm} + \Delta\lambda \cdot \frac{\partial r}{\partial \lambda} \qquad (0.21)$$

$$= r_{543\,nm} + (555\,nm - 543\,nm) \frac{r_{543\,nm} - r_{594\,nm}}{543\,nm - 594\,nm}$$

$$= \frac{39}{51} r_{543\,nm} + \frac{12}{51} r_{594\,nm}$$

Combining equations (0.19), (0.20), (0.21) and (0.18), the formula for the effective Abbe number can be written as:

$$V_{effective} = \frac{1}{170} \cdot \frac{(39 r_{543\,nm} + 12 r_{594\,nm})}{(r_{543\,nm} - r_{594\,nm})} \qquad (0.22)$$

The above formula (0.22) for the effective Abbe number requires knowledge only of the laser beam displacements due to the angular deviation imparted by the test lens. Other experimental parameters such as the lens power $P_L$, the distance of the measurement location from the optical center of the lens, and the distance R from the lens to the camera are not required and "cancel out" in the final formula. The values of $r_{594nm}$ and $r_{543nm}$ should be corrected for the initial lens displacement.

The effective Abbe number should be an excellent approximation to the actual Abbe number when the slope of the refractive index over the measurement range of 543 nm-to-594 nm is a good approximation to the slope over the entire Abbe range of 486 nm-to-656 nm. When this is not the case, the effective Abbe number, which is based upon a measurement range more coincident with the photopic peak, will give a much better indication of visual performance than the actual Abbe number.

Whereas the conventional Abbe value only applies to a single optical material, the effective Abbe value also applies to composite lenses. The effective Abbe value can vary with positions, such as radial position, within the composite lens.

Whereas the conventional Abbe value is independent of angle of incidence, the actual color behavior of a lens does depend upon the angle of incidence. The laser measuring apparatus allows one to take measurements with any angle of incidence, and the effective Abbe value measured will reflect the effect of angle of incidence. In this manner, the effective Abbe value is a very useful concept that more accurately characterizes the chromatic behavior of a lens.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

What is claimed is:

1. A system for determining an effective Abbe value of an optical element, the system comprising:
   a tunable laser capable of providing a collimated beam of light at one or more wavelengths;
   a spatial filter aperture to expand the collimated beam of light;
   a beam forming aperture to provide a spot beam of consistent diameter with a Gaussian intensity profile, wherein the said spot beam of one or more wavelengths impinges on a predetermined location of a test optical element, wherein the beam forming aperture receives the collimated beam from the spatial filter aperture;
   a detector that detects a centroid of the spot beam refracted through the test optical element of one or more wavelengths while the optical element is in a beam path; and
   a computation station that computes a location of the centroid of the spot beam on the detector with and without the test optical element in the beam path and determines the effective Abbe value of the test optical element based on the deflection of the centroid of the spot beam of one or more wavelengths.

2. The system according to claim 1, wherein the test optical element possess only a low order spherical prescription and not a plano or a cylindrical prescription.

3. The system according to claim 2, wherein the test optical element is selected from the group consisting of a single ophthalmic lens, a composite lens made of two ophthalmic lenses, a single ophthalmic lens with a layer of photopolymer that adheres to the lens, two ophthalmic lenses bonded together with an adhesive, and a layer of photopolymer sandwiched between the two ophthalmic lenses, wherein the photopolymer layer is capable of changing its refractive index with light.

4. The system according to claim 1, wherein the detector is a camera.

5. The system according to claim 4, wherein the camera is selected from a group consisting of a CMOS and a CCD camera.

6. The system according to claim 4, wherein the camera has a pixel size ranging from 1-10 microns.

7. The system according to claim 6, wherein the camera has a pixel size of 5 microns.

8. The system according to claim 4, wherein the camera does not possess a protective window to protect a sensor with one or more wirebonds.

9. The system according to claim 1, wherein the spatial filter aperture comprises an aperture of 1-1000 micron diameter.

10. The system according to claim 9, wherein the spatial filter aperture comprises an aperture of 10-20 micron diameter.

11. The system according to claim 1, wherein the beam forming aperture comprises an aperture of 10-10000 micron diameter.

12. The system according to claim 11, wherein the beam forming aperture comprises an aperture of 300-500 micron diameter.

13. The system according to claim 1, wherein the distance between the spatial filter aperture and the beam forming aperture is between 20-50 centimeters.

14. The system according to claim 1, wherein the distance between the beam forming aperture and the optical element is between 0.5-5.0 centimeters.

15. The system according to claim 1, wherein the distance between the beam forming aperture and the optical element is 2.5 centimeters.

16. The system according to claim 1, wherein the distance between the optical element and the detector is between 1-200 centimeters.

17. The system according to claim 1, wherein the system is stable during a measurement process while the beams of two or more wavelengths are steered.

18. The system according to claim 1, wherein the test optical element is aligned such that the beam impinges at 5-30 mm from the optical center and is parallel to the optical center of the said test optical element.

19. The system according to claim 1, wherein the test optical element is aligned such that the beam impinges at 8-10 mm from the optical center and is parallel to the optical center of the said test optical element.

20. The system according to claim 1, wherein the test optical element is aligned such that the beam impinges at 5-30 mm from the optical center is parallel to the optical center of the said test optical element.

21. The system according to claim 1, wherein the test optical element is aligned such that the beam impinges at 8-10 mm from the optical center and is oblique to the optical center of the said test optical element.

22. The system according to claim 1, wherein a generated beam path is stable, wherein the generated beam path is generated by the system comprising the spatial filter aperture and the beam forming aperture.

23. The system according to claim 1, wherein the test optical element is not moved during testing of the various wavelengths, insuring that a location and an angle of incidence are stable as the wavelength is changed.

24. The system according to claim 1, wherein the detector is not moved during testing at various wavelengths after a beam position has been recorded without the test optical element.

* * * * *